United States Patent [19]

Biggane

[11] 4,065,218
[45] Dec. 27, 1977

[54] SEISMIC BRACE

[75] Inventor: John D. Biggane, Oakland, Calif.

[73] Assignee: Super Strut, Inc., Oakland, Calif.

[21] Appl. No.: 740,557

[22] Filed: Nov. 10, 1976

[51] Int. Cl.² ............................................. F16C 11/00
[52] U.S. Cl. ...................................... 403/71; 403/209; 403/225; 52/167; 52/693
[58] Field of Search ............... 403/209, 119, 225, 226, 403/220, 71; 16/172, 128 R; 59/90, 91; 52/693, 167

[56] References Cited

U.S. PATENT DOCUMENTS

| 55,954 | 6/1866 | Hyde | 16/128 R |
|---|---|---|---|
| 190,850 | 5/1877 | Gusman | 16/128 R |
| 803,509 | 10/1905 | Ryan | 16/128 R |
| 3,233,928 | 2/1966 | Peickii et al. | 59/90 X |

Primary Examiner—Andrew V. Kundrat
Attorney, Agent, or Firm—George B. White

[57] ABSTRACT

Seismic or earthquake bracing includes brace members, in this form, a channel iron which at each end has an articulated connection respectively to a building element and to the item supported; each brace connector includes a pair of elements pivotally connected, and the hinged or pivot portions of at least one of the connector elements being provided with acoustical snubber which not only cushions the parts pivoted but also reduces noise of vibration which may be caused by earthquakes or the like.

2 Claims, 10 Drawing Figures

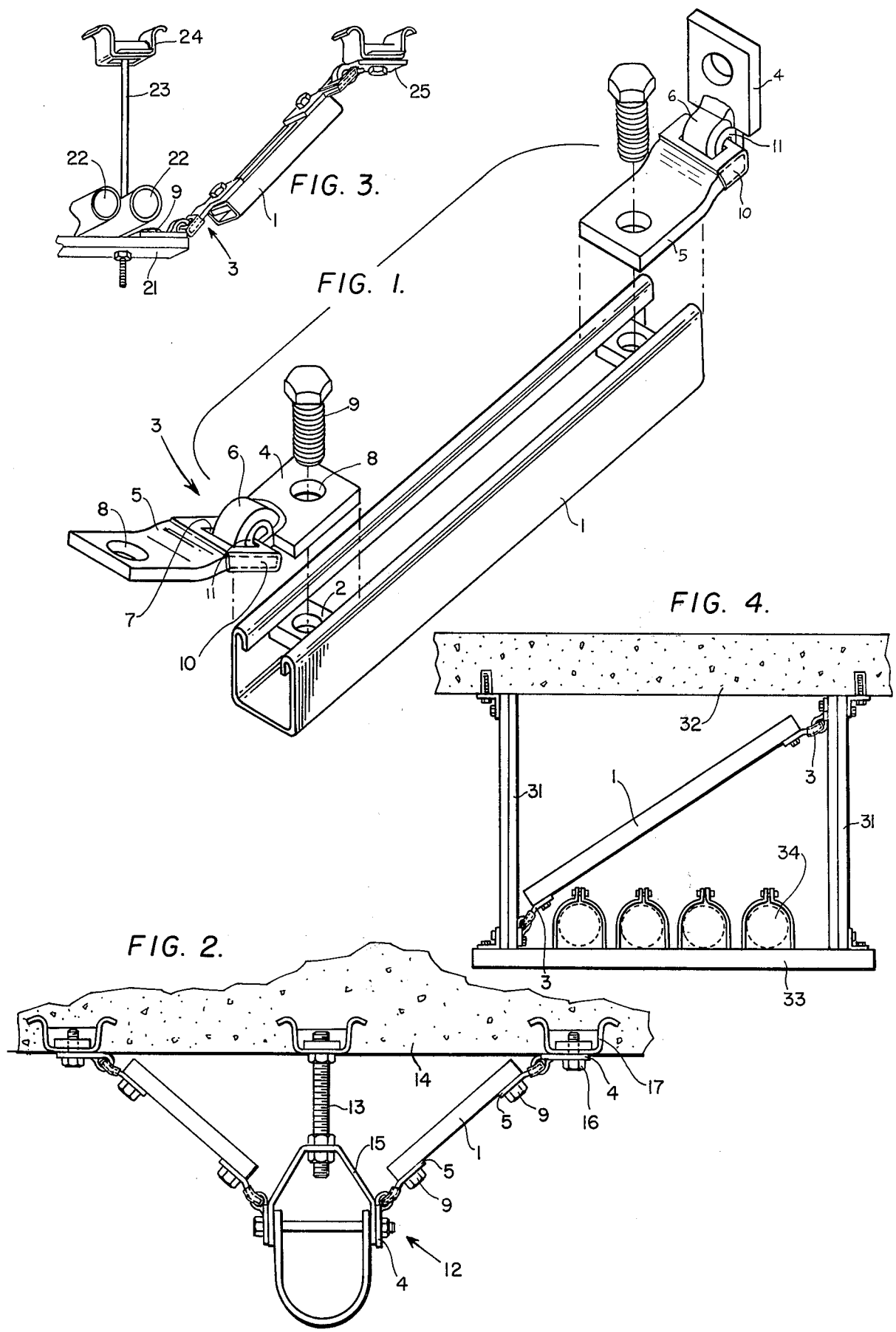

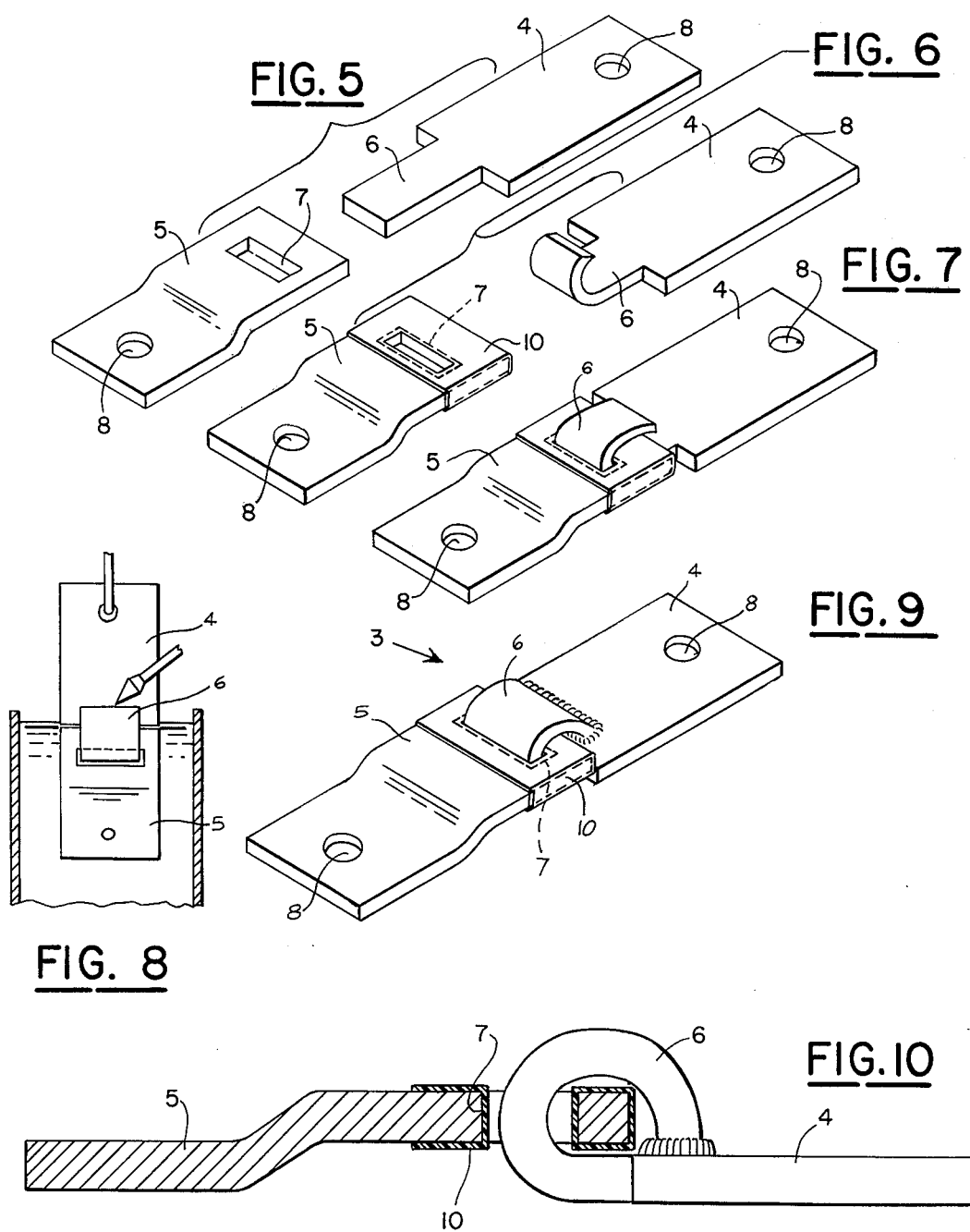

SEISMIC BRACE

BACKGROUND OF THE INVENTION

The seismic brace is an anti-movement brace used to prevent adverse sway or movement in the event of an earthquake. Seismic bracing is sometimes called earthquake bracing. In oder to keep the various independent elements of or whithin a building intact during an earthquake, adequate supports and seismic bracing must be installed. Without such seismic bracing the various independent elements of or within a building will be allowed to move independently. This independent movement can result in such elements breaking away from their installed position causing possible damage or inoperable conditions.

An object of the herein seismic bracing is to provide a structure which can be easily installed in selected positions and on various supports to prevent the swaying of the elements braced and to prevent excessive vibration of such elements as may be caused by earthquake or the like.

Another object of the invention is to provide a simple connector device which can be easily installed at each end of a brace member at various angles in which the brace member can be installed and which also reduces vibration and vibration noise of the bracing.

Another object of the invention is to provide a method whereby a connector device for bracings adjustable to a variety of angles is made so as to permit the efficient application of a suitable snubber between the relatively moveable pivot portions of the pivotted connector elements.

BRIEF DESCRIPTION OF THE DRAWINGS

FIG. 1 is a perspective developed view of a brace member and the connectors at its ends.

FIG. 2 is a front view of a support with the brace members and connectors.

FIG. 3 is a fragmental perspective view of a pipe hanger braced by the brace member and connectors.

FIG. 4 is a side view of another installation of a brace installation of a brace member and connectors.

FIG. 5 is a perspective view of the plates forming a connector.

FIG. 6 is a perspective view of the connector plates with the tongue bent.

FIG. 7 is a perspective view of the connectors with the tongue inserted and formed into a loop.

FIG. 8 shows part of the connectors dipped in cooling fluid during welding.

FIG. 9 is a perspective view of the completed connector after welding.

FIG. 10 is a partly sectional view of the connector.

DETAILED DESCRIPTION

Each brace 1 is a channel of substantially U-shaped cross-section with a nut 2 fixed near each end thereof within the cavity of the brace 1 facing toward the opening between the legs of the channel.

Each connector device 3 includes a pair of plates 4 and 5 with a loop 6 on the plate 4 moveable in an elongated slot 7 in plate 5. Each plate has therein a hole 8 near its end spaced from the loop 6, to accomodate a bolt 9 adapted to be screwed into the nut 2 within the U-shaped brace 1. When one plate 4 is secured to the nut 2 then the other plate 5 is secured to a support or base or hanging member to be braced.

The surfaces in and around the slot 7 is covered by an acoustical snubber 10. In one form this snubber 10 is formed by a coating on the plate 5 surrounding the slot 7 and also covering the interior walls on the slot 7. Selectively or in additon a snubber coating 11 may be also provided inside of the loop 6 to form a snubber bearing.

Various applications are illustrated herein for this seismic brace. For instance in FIG. 2 is shown so called clevis hanger 12 which is suspended from a threaded rod 13 anchored at the top in a ceiling 14. A seismic brace is extended from each side of the hanger 12 to the ceiling 14. The plate 4 of the seismic connector is secured to the usual yoke 15 of the hanger 12, and the other plate 5 is secured by the bolt 9 to the adjacent end of the brace 1 in the manner herein before described. Plate 4 of the connector at the other end of brace 1 is secured by a nut 16 to a bracket or plate 17 anchored in the ceiling 14. The plate 5 of each connector is mounted in the same manner at each end of the brace 1. In this manner the clevis hanger is braced against lateral vibration while the threaded rod 13 braces it against longitudinal movement.

In the form shown in FIG. 3 a channel bar 21 supports a plurality of pipes 22 which are strapped on the bar 21 by the usual pipe straps not shown. There is only a portion of one channel bar 21 shown but usually there are several along the length of the pipes. Each bar 21 is supported by one or more rods 23, each of which latter is anchored in a suitable bracket 24 on the ceiling or whatever support member there is on which the pipes are hung. The lateral brace 1 is secured by its connector 3 at each end thereof in the manner heretofore described at the one end by a bolt 9 to the hanging bar 21 and its other end in the manner heretofore described to a bracket 25 on the ceiling or surface from which the pipes are hung. Again the rods 23 inhibit longitudinal vibration, and lateral vibration is prevented, is inhibited and cushioned by the brace 1 and connectors 3 herein described.

In another form shown in FIG. 4 a hanging frame with vertical hangers 31 is hung from a supporting member such as a ceiling 32, and hanging on the lower end cross bars 33 on which rest pipes 34. The pipes are strapped on the cross bars 33 in the usual manner. To prevent collapse or lateral swinging of this frame the brace 1 is extended diagonally between opposite corners of the frame and the brace connections 3 are secured to the adjacent members of the corners in the same manner as heretofore described.

The brace connector herein is constructed and made by a novel method which prevents the softening or otherwise changing the characteristics of the snubber material and this method is illustrated in FIGS. 5 to 8 inclusive.

As shown in FIG. 5, a blank is cut and the hole 8 is formed through the blank which forms the hinge plate 4. Another blank is cut, in herein illustration with a slight offset at about the middle thereof, and the hole 8 is formed therein to form the plate 5. The elongated substantailly rectangular slot 7 is punched or otherwise formed in this plate 5.

The first plate 4 has a tongue from which the loop 6 is to be formed. As shown in FIG. 6 the tongue is reduced in width and is bent upward.

The end of plate 5 where the slot 7 is located is dipped into an acoustical material which is liquid in its initial stage and adheres to the outer surfaces as well as to the inside walls of the slot 7 so as to form the coating 10 heretofore described.

As shown in FIG. 7 the bent portion 6 is then extended through the slot 7 and is bent further upon itself into contact with the adjacent surface of the plate 4.

Then the plate 5 is dipped into a cooling substance such as in cold water to keep down the temperature of the coating while the end of the loop 6 is welded to the surface of the plate 4 as shown in cross-section in FIGS. 8 and 9. If desired, a suitable lining is also adhered to the inside surfaces of the loop 6 either before it is welded or thereafter.

The material of the coating in the herein illustration is an air hardened liquid plastisol which contains Trichlorephane, Methylene chloride and Toluene, sold under the tradename Plastic Dip made by Plasti-Dip International.

I claim:

1. An articulated connection comprising
a pair of flat plates,
one plate having a transverse slot adjacent one end thereof,
a tongue on one end of the other plate inserted through said slot, turned upon itself and having its end welded to said other plate,
an acoustical snubber coating bonded to all sides of said slot and to all surfaces of said one plate adjacent said slot,
each plate having a hole adjacent its other end for receiving a securing element,
and a member of substantially U-shaped cross-section,
a nut fixed near each end of said member, and a bolt extended through said hole of said one plate and secured in said nut thereby to form a pivotal connection for said end of said member.

2. The device specified in claim 1, and
a bolt extended through the hole of said one plate of another connector and secured in the nut a the other end of said member to form another pivotal connection.

* * * * *